United States Patent [19]

Priddy

[11] Patent Number: 4,910,274

[45] Date of Patent: Mar. 20, 1990

[54] PREPARATION OF MONOHYDROXY-CONTAINING POLYMERS

[75] Inventor: Duane B. Priddy, Midland, Mich.

[73] Assignee: The Dow Chemical Company, Midland, Mich.

[21] Appl. No.: 307,690

[22] Filed: Feb. 7, 1989

Related U.S. Application Data

[63] Continuation of Ser. No. 126,069, Nov. 27, 1987, abandoned.

[51] Int. Cl.$^4$ ............................................. C08F 2/00
[52] U.S. Cl. ................................. 526/210; 526/212; 526/217; 526/223; 526/227; 526/232; 526/211; 526/219
[58] Field of Search ............... 526/211, 210, 219, 212, 526/217, 223, 227, 232

[56] References Cited

U.S. PATENT DOCUMENTS

| | | | |
|---|---|---|---|
| 2,380,475 | 2/1941 | Stewart | 526/211 |
| 2,450,000 | 9/1948 | Howk et al. | 526/211 |
| 2,665,269 | 1/1954 | Reynolds et al. | 526/211 |
| 3,053,806 | 9/1962 | La Combe et al. | 526/211 |
| 3,364,182 | 1/1968 | Griffith | 526/211 |
| 3,453,249 | 7/1969 | Szita et al. | 526/211 |
| 3,461,187 | 8/1969 | Cantrill | 525/148 |
| 3,718,633 | 2/1973 | Baldwin et al. | 526/211 |
| 3,816,380 | 6/1974 | Reed, Jr. | 526/211 |
| 3,960,824 | 6/1976 | Hicks | 526/211 |
| 3,991,009 | 11/1976 | Margotte et al. | 524/533 |
| 4,054,480 | 10/1977 | Skoultchi et al. | 526/211 |
| 4,063,012 | 12/1977 | MacLeay et al. | 526/211 |
| 4,064,161 | 12/1977 | Lewis et al. | 526/320 |
| 4,156,764 | 5/1979 | White | 526/211 |
| 4,189,552 | 2/1980 | Kuwata et al. | 526/211 |
| 4,319,003 | 3/1982 | Gardlund | 525/148 |

FOREIGN PATENT DOCUMENTS

| | | | |
|---|---|---|---|
| 0029874 | 9/1973 | Japan | 526/211 |
| 0072089 | 6/1978 | Japan | 526/211 |
| 0070393 | 6/1979 | Japan | 526/211 |
| 0072003 | 6/1981 | Japan | 526/211 |
| 0274356 | 9/1970 | U.S.S.R. | 526/211 |
| 0840049 | 6/1981 | U.S.S.R. | 526/211 |

*Primary Examiner*—Joseph L. Schofer
*Assistant Examiner*—J. M. Reddick
*Attorney, Agent, or Firm*—Price, Heneveld, Cooper, Dewitt & Litton

[57] ABSTRACT

A method for preparing hydroxyl-containing polymers comprising polymerizing at least one free radical-polymerizable monomer in the presence of at least one monohydroxy-containing chain transfer agent and at least one hydroxy-containing free radical initiator. The method results in monohydroxy-functional polymers in yields in excess of 90%.

14 Claims, No Drawings

PREPARATION OF MONOHYDROXY-CONTAINING POLYMERS

This is a continuation of application Ser. No. 07/126,069, filed Nov. 27, 1987, and now abandoned.

BACKGROUND OF THE INVENTION

This invention relates to the preparation of monohydroxy-functional polymeric materials. Such compounds have been widely used in adhesive, coating and molding compositions, as plasticizers, leveling agents, melt index modifiers, solvents and to modify properties of other chemical compositions, particularly other and different polymers, with which they may be partially or wholly incompatible.

In their use as polymer modifying materials, monohydroxyl-containing polymers have been employed as blend materials or, in an attempt to improve compatibility, they have been interpolymerized with other and different compounds to form copolymeric products. Such copolymers are random ABABA . . . type, block AB type or block ABA type.

Monohydroxy-functional polymers can be produced by using monohydroxyl-functional chain transfer agents. However, yields of monohydroxy-functional polymers are less than 90%, typically around 80%. Some polymer chains are formed having no hydroxyl functionality. On the other hand, if hydroxy-functional initiators are used, dihydroxy terminal polymers are produced.

The object of the present invention is to improve yields in the formation of monohydroxy-functional polymers.

SUMMARY OF THE INVENTION

In the present invention, monohydroxy-functional polymeric materials are made by reacting at least one ethylenically unsaturated monomer in the presence of at least one monohydroxy-functional chain transfer agent and at least one hydroxy-functional free radical polymerization initiator. Surprisingly, rather than producing substantially a di-hydroxy functional polymer, the method of the invention yields more than 90% monohydroxy-functional polymers.

DESCRIPTION OF THE PREFERRED EMBODIMENTS

The ethyleneically-unsaturated monomers which are polymerized in accordance with the preferred embodiment of this invention can be substantially any monoethylenically-unsaturated monomer which can be polymerized via a free radical polymerization mechanism. Examples of such polymerizable monomers include methyl acrylate, ethyl acrylate, butyl acrylate, hexyl acrylate, decyl acrylate, lauryl acrylate, stearyl acrylate, cyclopentyl acrylate, cyclohexyl acrylate, the corresponding methacrylates, acrylamide, acrylonitrile, monoesters and diesters of maleic and fumaric acids, vinyl chloride, vinyl bromide, vinylidiene chloride, methacrylonitrile, vinyl acetate, vinyl propionate, vinyl benzoate, vinyl methyl ether, vinyl isobutyl ether, styrene, alphamethyl styrene, vinyl toluene, p-ethyl styrene, 2,4-methyl styrene, o-chloro styrene and 2,5-dichloro styrene. Mixtures of such monoethylenically unsaturated monomers can be employed.

Chain transfer agents which can be employed in this invention contain one hydroxy group, thereby insuring that the resulting polymer of ethylenically unsaturated monomer will have a single terminal hydroxyl-containing moiety. Suitable chain transfer agents include 2-mercaptoethanol, thiopropylene glycol, 2-ethylhexyl thioglycolate and 2-mercaptopropanol, with 2-mercaptoethanol being currently preferred. Bifunctional chain transfer agents such as bis-(4-hydroxy phenyl) disulfide, which disassociate into two monofunctional chain transfer segments, can also be employed in the practice of this invention. The term "monohydroxy functional chain transfer agent" as used herein is intended to include dihydroxy functional chemicals which disassociate in this manner such that each dissociated segment acts as a monohydroxy functional chain transfer agent.

The polymerization initiator for the free radical polymerization of the monoethylenically unsaturated monomer contain at least one free hydroxy group. While the reaction is not completely understood, the hydroxy group of the polymerization initiators employed in the present invention appears to direct and drive the reaction to a higher level of completion with respect to forming polymers having only one terminally located hydroxy functional group. The use of the hydroxy functional polymerization initiators in combination with the monohydroxy functional chain transfer agents insures that at least 90% of the polymer product will have a single hydroxy group on the individual polymer molecules, with less than 10% of such polymer molecules having no hydroxy groups. This is in contrast to prior art systems which employ polymerization initiators such as benzoyl peroxide or azobisisobutyronitrile in combination with chain transfer agents such as 2-mercapto ethanol, which provide polymer products wherein not more than about 80% of the individual molecules have a monohydroxy group. Representative free radical polymerizations which can be employed in the practice of this invention include hydroxy alkyl peroxides, and hydroxy alkyl alkyl peroxides. Representative of such peroxides are 1-hydroxy-n-butyl peroxide, bis-(1-hydroxy cyclohexyl) peroxide, 12-hydroxy peroxy stearic acid, di(4-hydroxy butyl)-2,2'-azobisisobutyrate, di(3-hydroxy propyl)-2,2'-azobisisobutyrate and di(2-hydroxy ethyl)-2,2'-azobisisobutyrate. Although no free radical initiators containing two hydroxy groups, such as the hydroxy alkyl peroxides, are currently commercially available, it is anticipated that the availability of such initiators could provide products in which substantially all of the polymer product would contain the desired monohydroxyl functionality.

The amount of the chain transfer agent to be employed in the polymerization mixtures in accordance with the present invention is within the range of 0.001 to 5% by weight, preferably 0.005 to 2% by weight based on the monomer or monomers charged into the polymerization reactor. The amount of the polymerization initiator will be in the range of 0.001 to 5%, and preferably 0.01 to 1% by weight based on the monomer or monomers charged into the polymerization reactor.

The polymerization process can be carried out by bulk polymerization, solution polymerization, suspension polymerization, emulsion polymerization, continuous bulk/solution polymerization and the like, with solution polymerization being currently preferred. Polymerization reaction temperatures can be any at which the polymerization reaction takes place, e.g., 0° C. or less to 150° C. or more, and preferably from 50°C. to about 100°C. Basically, the reaction time varies with quantity of reactant as well as the life of the free radical initiator employed, however, basically the reaction time can be any time, e.g., from about 5 minutes or less to 2 hours or more. Those skilled in the art can readily determine the appropriate reaction time and temperatures through routine experimentation.

The hydroxy-functional polymers of monoethylenically unsaturated monomers which are produced in accordance with this invention are particularly adapted for the preparation of block copolymers of the ABA variety by reacting the monohydroxy polymers of this invention with a polymer which has at least two moieties which are reactive with hydroxyl functionality.

The following example will serve to illustrate the invention.

EXAMPLE 1

Preparation of Hydroxyl Functional Styrene Acrylonitrile Polymer

A reaction vessel was charged with 900 grams styrene, 300 grams acrylonitrile, 6 grams phenylazophenyl acrylate, 12 grams 2-mercaptoethanol and 12 grams of 50% active 1,1-dimethyl-3-hydroxybutylperoxy-2-ethyl hexanoate and 300 grams of toluene.

This solution was pumped continuously at a rate of 10 cc per minute into a second reactor equipped with a mechanical stirrer, thermometer and heating bath. The reactor temperature was raised to 90°C. and maintained at that temperature ±1°C. After 3 hours, the entire contents of the first vessel had been transferred to the second reactor. Heating was contained for another 30 minutes to give syrup containing 56% by weight of polymer.

The syrup was freed of volatile components by heating in a vacuum oven at 75°C. for 20 hours. Size exclusion chromatographic analysis of the polymer product showed that it had a weight average molecular weight of 6700 and a number average molecular weight of 2825 compared against polycarbonate standards. More than 90% of the individual polymer chains contained only one hydroxyl group with less than 10% of the individual polymer molecules being nonfunctional.

It is understood that the above is merely a preferred embodiment and that various changes and alterations can be made without departing from the spirit and broader aspects of the invention.

The embodiments of the invention in which an exclusive property or privilege is claimed are defined as follows.

1. A method for preparing monohydroxy containing polymers in yields in excess of 90 percent comprising polymerizing at least one free radical-polymerizable monoethylenically unsaturated monomer in the presence of at least one monohydroxy-containing chain transfer agent and at least one hydroxy-containing free radical initiator.

2. A method in accordance with claim 1 wherein said chain transfer agent comprises 2-mercapto ethanol.

3. A method in accordance with claim 1 wherein said chain transfer agent is present in an amount in the range from 0.001 to 5% by weight, based on polymerizable monomers.

4. A method in accordance with claim 1 wherein said chain transfer agent is present in an amount in the range from 0.005 to 2% by weight, based on polymerizable monomers.

5. A method in accordance with claim 3 wherein said chain transfer agent comprises 2-mercapto ethanol.

6. A method in accordance with claim 1 wherein said polymerization initiator is present in an amount in the range from 0.001 to 5% by weight, based on polymerizable monomers.

7. A method in accordance with claim 1 wherein the amount of said initiator is in the range from 0.01 to 1% by weight, based on polymerizable monomers.

8. A method in accordance with claim 1 wherein said chain transfer agent is present in an amount in the range from 0.001 to 5% by weight and said polymerization initiator is present in an amount in the range from 0.001 to 5% by weight, said amounts being based on polymerizable monomer.

9. A method in accordance with claim 1 wherein the amount of said chain transfer agent is in the range from 0.001 to 2% by weight and said polymerization initiator is present in an amount in the range from 0.01 to 1% by weight, said weight percents being based on polymerizable monomer.

10. A method in accordance with claim 1 for preparing monohydroxy-containing polymers comprising polymerizing at least one free radical-polymerizable monoethylenically unsaturated monomer in the presence of at least one monohydroxy-containing chain transfer agent and at least one hydroxy-containing free radical initiator selected from the group consisting of 1-hydroxy-n-butyl peroxide, bis-(1-hydroxy cyclohexyl) peroxide, 12-hydroxyperoxy stearic acid, di(4-hydroxy butyl)-2,2'-azobisisobutyrate, di(3-hydroxy propyl)-2,2'-azobisisobutyrate, di(2-hydroxy ethyl)-2,2'-azobisisobutyrate and 1,1-dimethyl-3-hydroxybutyl-peroxy-2-ethyl hexanoate.

11. A method in accordance with claim 10 wherein said chain transfer agent is selected from the group consisting of 2-mercapto ethanol, thiopropylene glycol, 2-ethylhexylthioglycolate, 2-mercapto propanol and bis-(4-hydroxyphenyl) disulfide.

12. A method in accordance with claim 10 wherein said polymerization is effected in the presence of from 0.001 to 5 percent by weight, based on polymerizable monomers, of said at least one monohydroxy-containing chain transfer agent.

13. A method in accordance with claim 12 wherein the amount of said at least one hydroxy-containing free radical initiator is in the range from 0.001 to 5 percent by weight based on polymerizable monomer.

14. A method in accordance with claim 10 wherein the amount of said at least one monohydroxy-containing chain transfer agent is in the range from 0.001 to 2 percent by weight and the amount of said at least one hydroxycontaining free radical initiator is in the range from 0.01 to 1 percent by weight, said weight percents being based on polymerizable monomer.

* * * * *

UNITED STATES PATENT AND TRADEMARK OFFICE
CERTIFICATE OF CORRECTION

PATENT NO.  : 4,910,274

DATED       : March 20, 1990

INVENTOR(S) : Duane B. Priddy

It is certified that error appears in the above-identified patent and that said Letters Patent is hereby corrected as shown below:

On the title page, listed under the References Cited, U.S. PATENT DOCUMENTS, insert below the following in the correct order, --4,09501 6/1978 Schmitt et al. . . . 526/211--, --4,243,787 1/1981 Boileau et al. . . . 526/211--, and --4,593,081 6/1986 Bobsein et al. . . . 526/211--.

Column 1, line 49, "ethyleneically-unsaturated" should correctly appear as --ethylenically-unsaturated--.

Column 4, line 36, "12-hydroxyperoxy" should correctly appear as --12-hydroxy peroxy--.

Signed and Sealed this

Twenty-sixth Day of May, 1992

Attest:

DOUGLAS B. COMER

Attesting Officer

Acting Commissioner of Patents and Trademarks